United States Patent [19]

Miki et al.

[11] 4,404,162

[45] Sep. 13, 1983

[54] PROCESS FOR PRODUCING A THIN-WALL DEEP DRAWN CONTAINER OF THERMOPLASTIC RESIN

[75] Inventors: Kyosuke Miki, Yokohama; Masahiro Takeuchi, Yamato; Toshio Suzuki, Yokohama, all of Japan

[73] Assignee: Sumitomo Bakelite Company Ltd., Japan

[21] Appl. No.: 167,588

[22] Filed: Jul. 11, 1980

[30] Foreign Application Priority Data

Jul. 16, 1979 [JP] Japan .................................. 54-89231
Feb. 27, 1980 [JP] Japan .................................. 55-22655

[51] Int. Cl.³ .................. B29C 17/04; B29D 9/04
[52] U.S. Cl. .................. 264/514; 264/512; 264/522; 264/550; 425/384; 425/387.1
[58] Field of Search ............... 264/512, 522, 549, 550, 264/551, 514, 515; 425/384, 387.1

[56] References Cited

U.S. PATENT DOCUMENTS 2,854,694 10/1958 Mumford ............................ 264/550
3,470,281 9/1969 Knowles ............................ 264/551
3,757,718 9/1973 Johnson ......................... 264/512 X

*Primary Examiner*—Jan H. Silbaugh
*Attorney, Agent, or Firm*—Karl W. Flocks; Sheridan Neimark

[57] ABSTRACT

A thin-wall deep drawn container having a molding depth vs. aperture caliber ratio of 2.0 or more, having a mean wall thickness of 0.1–0.6 mm at the sidewall and bottom of the hollow part and having a flange part of 1.4 mm or less in thickness at the aperture end can be produced from a thick sheet of a thermoplastic resin, preferably a crystalline plastic, having a thickness of 2 mm or more by plug-assist pressure forming.

2 Claims, 10 Drawing Figures

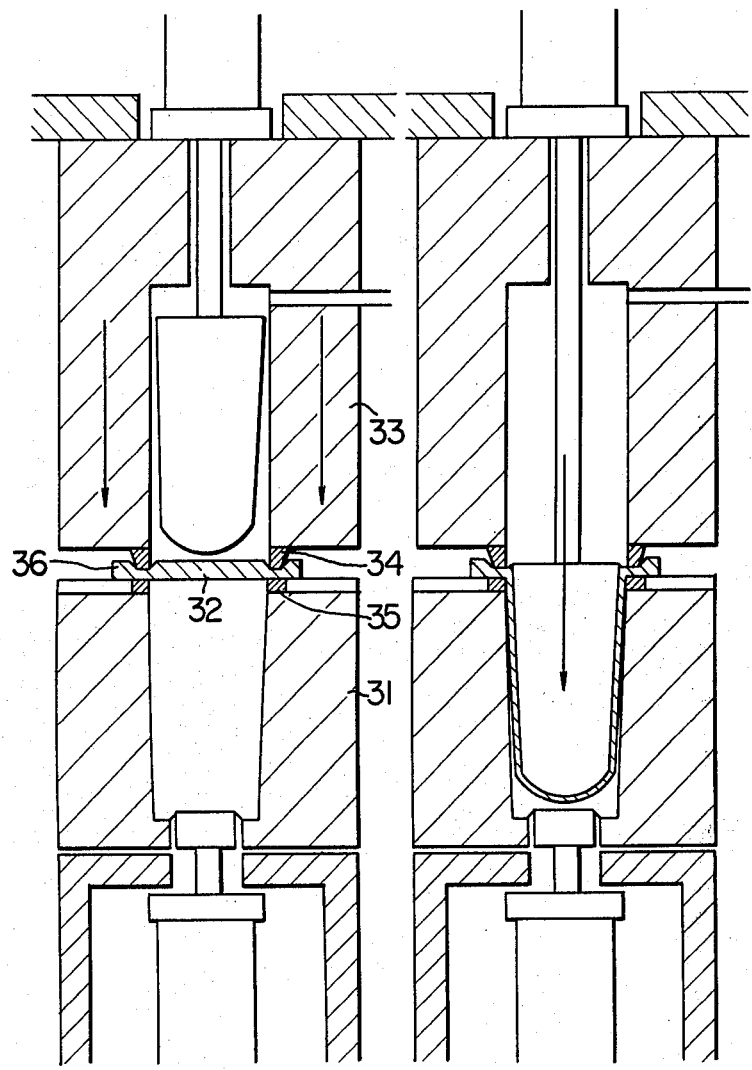

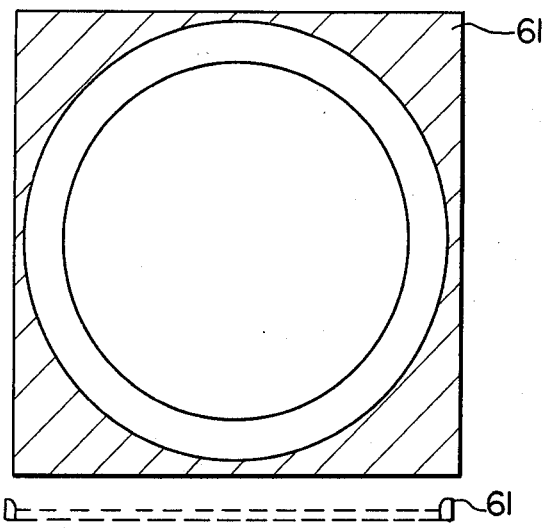
FIG. 6
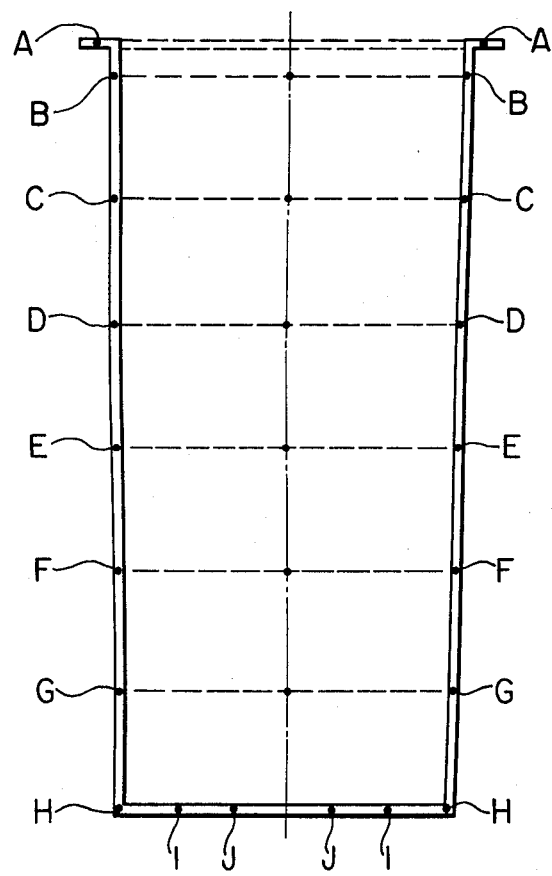

PROCESS FOR PRODUCING A THIN-WALL DEEP DRAWN CONTAINER OF THERMOPLASTIC RESIN

This invention relates to a process for producing a thin-wall deep-drawn container from a thermoplastic resin sheet, as well as to said container, More particularly, this invention relates to a process for producing a thin-wall super-deep-drawn container having a high molding depth vs. aperture caliber ratio from a thick plastic sheet by a combination of press-forging method and an improved plug-assist pressure forming method, as well as to said container.

As a process for producing a thin-wall cup-shaped container having a great molding depth from a plastic sheet, the pressure forming method using an auxiliary plug has long been known. As an application of this plug-assist pressure forming method, the solid phase pressure forming of a polyolefin sheet such as polypropylene sheet and the like was proposed (for example, Japanese Patent Application Kokai (Laid-Open) No. 11,489/1972, etc.). In this process, a thin sheet of a polyolefin is preheated to a temperature not higher than the melting point of the sheet and then subjected to plug-assist pressure forming, so that there is seen an effect that no wrinkle due to the sag of preheated sheet is formed in the flange part of the thin-wall cup-shaped container produced.

However, when a deep-drawn container is formed from a plastic sheet according to such a known plug-assist assist pressure forming method, there is a marked tendency that at the time of preliminary forming with a plug, the central part of the sheet contacted with the plug becomes thick while the peripheral parts of the sheet not contacting with the plug are highly stretched to become thin. In the case of solid phase pressure forming of a polypropylene sheet, the difference in wall thickness between the part contacted with the plug and the part not contacted with the plug is retained even in the final molded article, and this difference in wall thickness results in a conspicuous line at the boundary to injure the appearance or weakens the stiffness of the upper sidewall of the container. Such a tendency is particularly outstanding in the forming of containers having a great molding depth, and it has hitherto been difficult to produce a deep-drawn container having a uniform wall thickness distribution by thermoforming a sheet. Further, when a super-deep-drawn container having a high molding depth vs. aperture caliber ratio is produced from a thick plastic sheet by the known plug-assist pressure forming method, the wall thickness in the hollow part of the container becomes thin and, in addition, the thickness of flange part of the container becomes equal to that of the original sheet and the difference in wall thickness becomes great between the flange part and the hollow part, so that it is difficult to produce a thin-wall deep-drawn container having a practically satisfactory wall thickness distribution.

The present inventors have conducted studies with the aim of discovering a process for producing a thin-wall container so uniform in wall thickness distribution, so great in molding depth and so excellent in stiffness as to be unachievable by the processes so far proposed from a plastic sheet. As a result, it has been found that, in the plug-assist pressure forming method comprising drawing a preheated plastic sheet into a female mold by means of a heated plug and then forming the sheet onto the surface of the female mold by means of air pressure, a plug having such shape and size that the plug-side surface of the sheet drawn into the female mold can uniformly adhere to the plug surface over its whole area when the plug is inserted to the final insertion position is desirable for making uniform the wall thickness distribution of the hollow part of the container. On the basis of this finding, the inventors have further advanced extensive studies to accomplish this invention. In the super-deep-drawn container having a molding depth vs. aperture caliber ratio of 2 or more produced according to the process of this invention, the ratio of the inner wall area of the container after forming to the area of the sheet before forming (hereinafter referred to as the area stretch ratio) reaches 9 or more, so that the container is so highly orientated as to be comparable to biaxially oriented film and is remarkably improved in properties such as gas barrier property, stiffness, gloss, transparency, etc.

It is an object of this invention to provide a process for producing a thin-wall container uniform in wall thickness distribution, great in molding depth and excellent in transparency, stiffness, etc. from a monolayer sheet of a thermoplastic resin such as styrene resin, vinyl chloride resin, polyolefins including polyethylene, polypropylene and the like, and polyester resin, preferably a crystalline plastic, or from a multi-layer sheet composed mainly of these resins, and to provide said container.

It is another object of this invention to provide a process for producing a thin-wall container uniform in wall thickness distribution and great in molding depth from a thermoplastic resin sheet with only a small amount of scrap being formed in the production step of the container.

Other objects and advantages of this invention will become apparent from the following description.

According to this invention, there is provided a thin-wall deep-drawn container formed from a thermoplastic resin, characterized in that it has a ring flange part at its aperture end, the container depth vs. aperture caliber ratio is 2.0 or more, the mean wall thickness of sidewall and bottom is 0.1–0.6 mm, and the thickness of the flange is 0.6–1.4 mm.

According to this invention, there is further provided a process for producing a thin-wall deep-drawn container having a ring flange part around the aperture end of its cavity from a thermoplastic sheet by plug-assist pressure forming, characterized in that said thermoplastic resin sheet is preheated to a moldable temperature, then the ring flange part is formed by forging and cooling the peripheral part of said sheet while applying a pressure of 100 kg or more per cm² of the forging surface from both upside and downside by means of a pair of ring-shaped forging means (their inner shape and size are the same as those of the aperture end of the cavity of the female mold), and said sheet is then drawn into the cavity of the female mold to a depth of 80% or more based on the depth of said cavity by means of a plug maintained at a temperature ranging from $(T_s+10)°C$ to $(T_s-40)°C$ in which $T_s$ is the temperature of the preheated sheet, while sufficiently compressing said flange part with said pair of forging means to preliminarily stretch the part of sheet contacted with the inside of the flange, then a pressure fluid is introduced onto the sheet from the plug side to stretch the part of the sheet contacted with the inside of the flange by the pressure difference till the area stretch ratio reaches 9 or more based on the original sheet, whereby the sheet is formed on the surface of the cavity of the female mold so as to have a concave shape having a molding depth vs. caliber ratio of 2.0 or more.

The term "molding depth" used herein means the length from the aperture end to the bottom of the container and the term "caliber" used herein means the maximum inner diameter among the inner diameters of the aperture of the container. In the case of cylindrical container, the caliber is the diameter of the aperture, in the case of a container having an elliptical aperture, the caliber corresponds to the longer axis of the ellipse, and in the case of a rectangular container, it corresponds to the diagonal diameter of the aperture.

The forging means used in this invention is preferably composed of a female mold side forging means having a ring shape and positioned at the aperture end of the cavity of a female mold, the inside shape and size of the ring-shaped forging means being the same as those of the aperture end of the cavity of the female mold, and an auxiliary mold side ring-shaped forging means which is in pair to the female mold side forging means and placed in the face of the female mold side forging means.

The plug used in this invention has preferably the following conditions: (a) it is composed of the front part and the rear part in which the front part contains a curved contour part in all the plug cross-sections including the central axis along the direction of movement of the plug and parallel to said central axis, the contour line of the front part is smoothly connected with the contour line of the rear part, and the rear part is composed of the substantially linear, preferably slightly outside-curved, contour part directed to the rear terminal part of the plug; (b) the shape of contour of a cross-section perpendicular to the central axis of the plug is the same as the shape of the contour of the aperture end of the female mold at the same height as the aperture end of the female mold, and its size is smaller than the size of the contour of the aperture end of the female mold over the whole circumference by a quantity substantially corresponding to the thickness of said sheet so that, at the final position of said plug inserted into the female mold, the preheated sheet drawn into the hollow part of the female mold can contact with the surface of said plug over the whole surface on the plug side; and (c) the diameter of the plug gradually decreases from the rear end to the front part.

Hereunder, this invention will be illustrated with reference to the accompanying drawings. In the drawings, FIG. 1 shows one example of the apparatus for producing a plastic container according to the process of this invention.

FIGS. 3a to 3d show the steps for producing a plastic container according to the process of this invention.

FIG. 6 presents the wall thickness measurement points A to J of a container having a depth vs. caliber ratio of 2.0 and the top and side views of the scrap formed.

Figure 7:
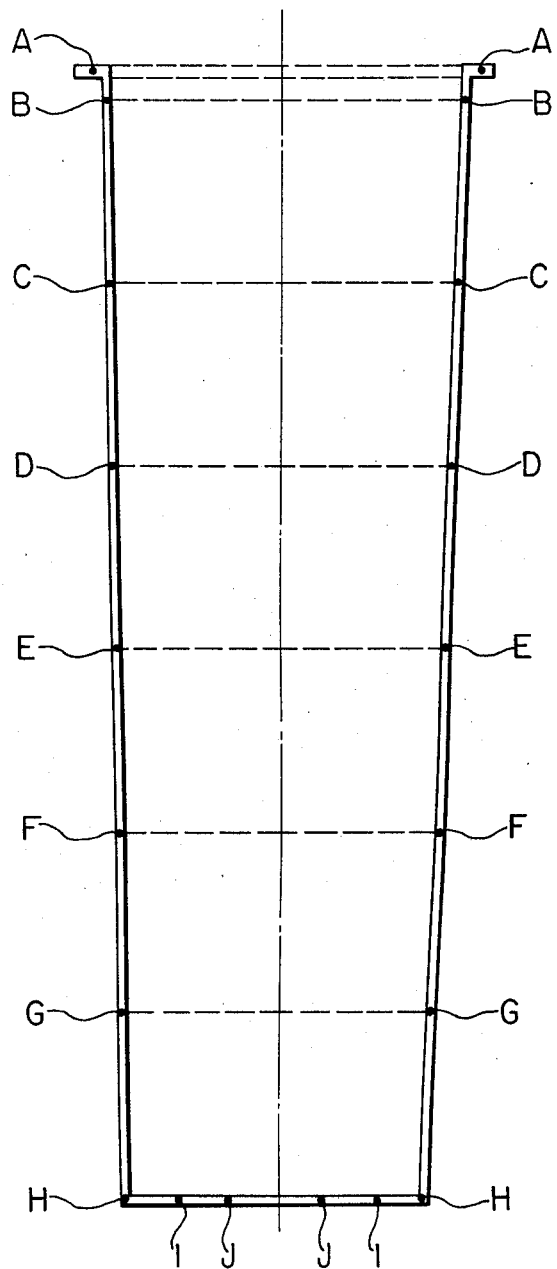

FIG. 7 presents the wall thickness measurement points A to J of a container having a depth vs. caliber ratio of 3.0.

Figure 1:
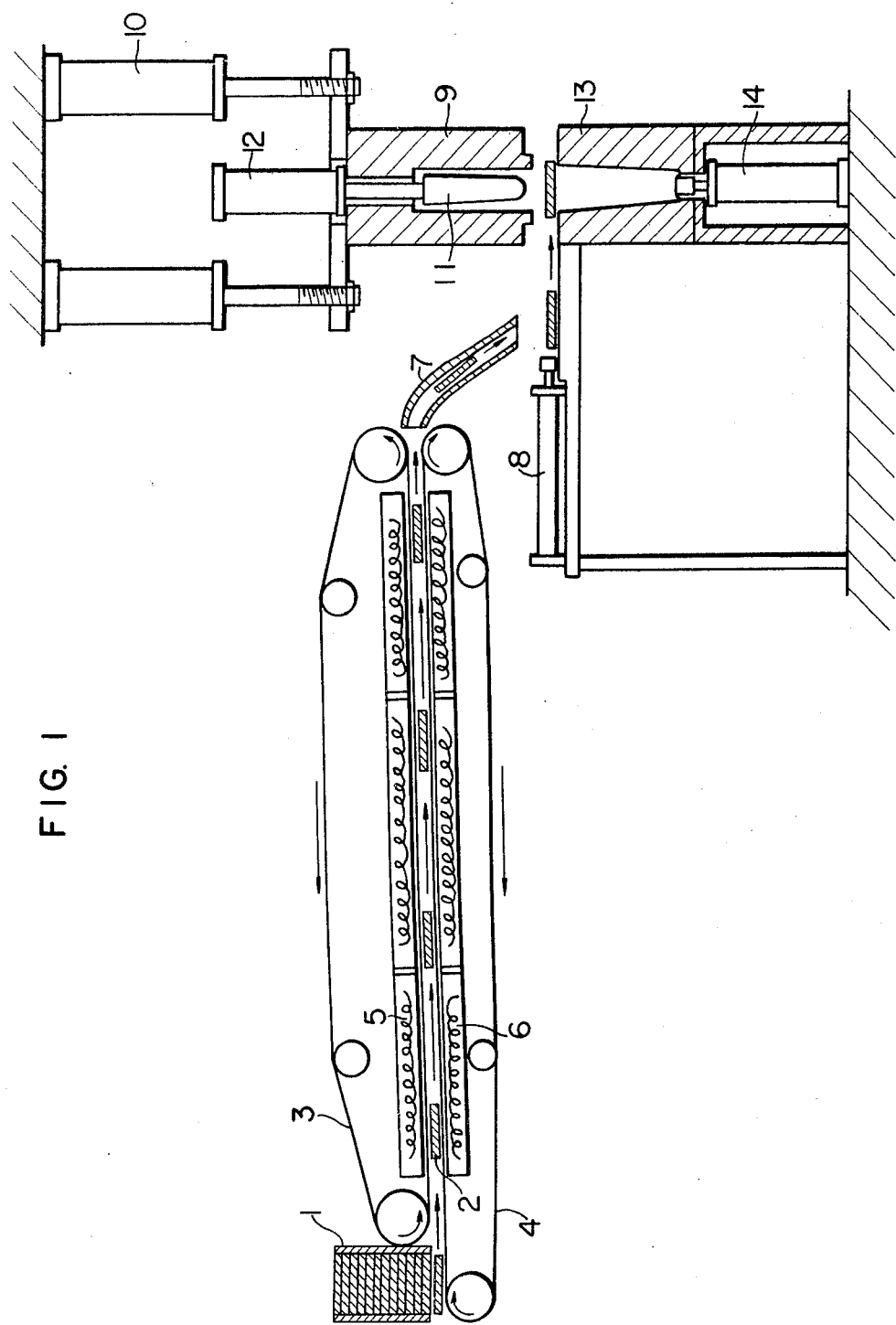
Figure 2:
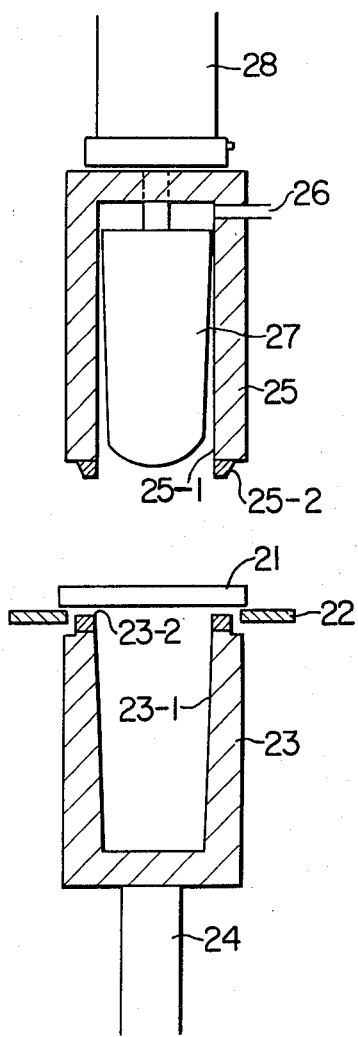
FIG. 2 shows a set of female mold, auxiliary mold and plug used in this invention.
Figure 4:
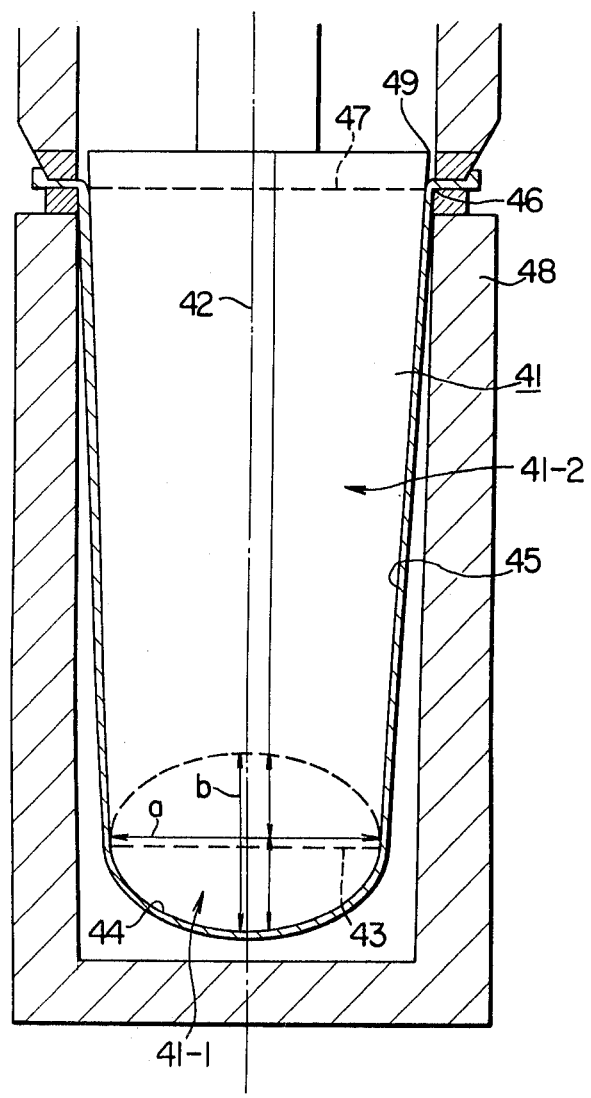
FIG. 4 shows the state of a plug which has drawn the sheet to the final plug insertion position in the female mold when the plug used has the desirable shape in this invention.
Figure 5:
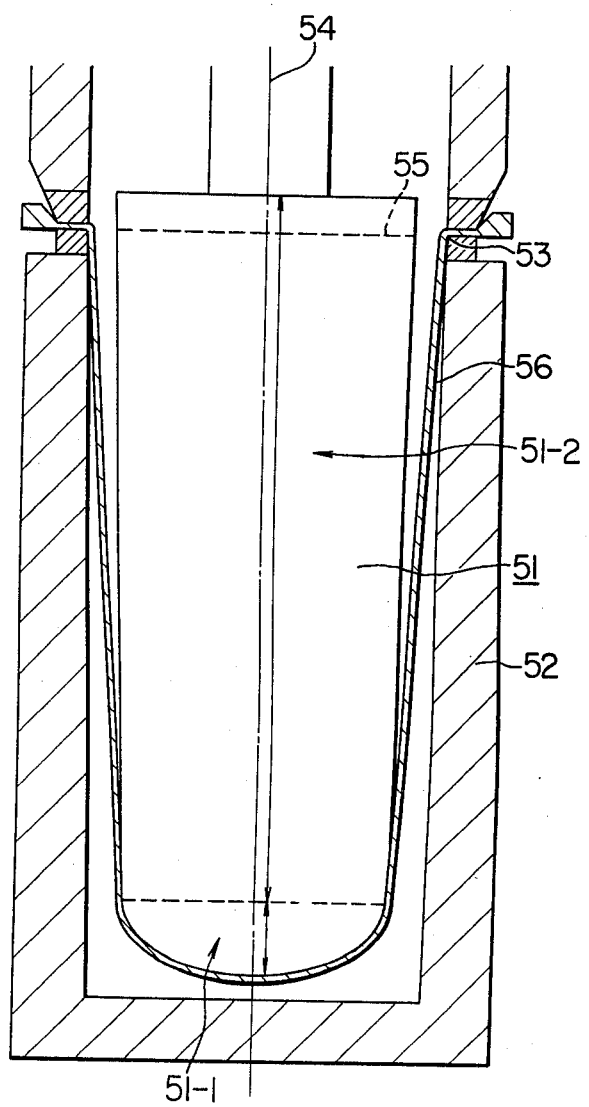
FIG. 5 shows the detailed shape of a known plug.

In FIG. 1, 1 is a sheet-feeding means, 2 is a sheet to be formed, 3 is an upside conveyor belt, 4 is a downside conveyor belt, 5 is an upside hot press plate, 6 is a downside hot press plate, 7 is a transfer means for preheated sheet, 8 is an air cylinder for feeding sheets, 9 is an auxiliary mold, 10 is an air cylinder for shifting the auxiliary mold, 11 is a plug, 12 is an air cylinder for shifting the plug, 13 is a female mold, and 14 is an air cylinder for releasing the molded article from the mold. In FIG. 2, 21 is a preheated plastic sheet, 22 is a sheet transfer plate, 23 is a female mold, 23-1 is the cavity of the female mold, 23-2 is forging part of the female mold, 24 is a piston bar of the air cylinder for up-down shifting the female mold, 25 is an auxiliary mold, 25-1 is the cavity of the auxiliary mold, 25-2 is the forging part of the auxiliary mold, 26 is a feeding path for compressed air, 27 is a plug, and 28 is an air cylinder for shifting the plug. In FIGS. 3a to 3d, 31 is a female mold, 32 is a sheet, 33 is an auxiliary mold, 34 is a forging part of the auxiliary mold, 35 is the forging part of the female mold, 36 is a flange part of container, 37 is a feeding path for compressed air, 38 is an ejecting means and 39 is a scrap part. In FIG. 4, 41 is a plug, 41-1 is the front part of the plug, 41-2 is the rear part of the plug, 42 is the central axis of the plug, 43 is the boundary line between the front and rear parts of the plug, 44 is the contour line of the front part of the plug, 45 is the contour line of the rear part of the plug, 46 is the aperture end of the female mold, 47 is the same height as said aperture end, 48 is a female mold, 49 is the rear end of the plug, and a and b are the long and short axes of ellipse, respectively. In FIG. 5, 51 is a plug, 52 is a female mold, 53 is the aperture end of the female mold, 54 is the central axis of the plug, 55 is the same height as the aperture end of the female mold, 56 is a sheet, 51-1 is the front part of the plug, and 51-2 is the rear part of the plug. In FIG. 6, 61 is a scrap and A to J represent the points at which the wall thickness was measured. In FIG. 7, A to J represent the points at which the wall thickness was measured.

In FIG. 1, the sheet 2 fed from the sheet-feeding means 1 is placed on the downside conveyor belt 4. While putting the sheet between the upside conveyor belt 3 and the downside conveyor belt 4, it is sent to the gap between the upside hot press plate 5 and the downside hot press plate 6 equipped with the respective internal heaters. While pressing the sheet between the upside hot press plate 5 and the downside hot press plate 6, the sheet is shifted toward the outlet of the sheet preheater. In the apparatus of FIG. 1, there are provided three pairs of upside and downside hot press plates and the sheet is successively shifted to the gap between the adjacent pair of upside and downside hot press plates by means of the upside and downside conveyor belts. The said conveyor belts are preferably made of a material such as glass cloth impregnated with a fluorocarbon resin. The sheet heated to a moldable temperature is fed to the sheet transfer means 7. After leaving the sheet transfer means 7, the sheet is fed to the female mold 13 by means of the sheet-feeding air cylinder 8 and formed in the female mold 13.

Though FIG. 1 shows a case in which the sheet is used after being cut into a specific shape, it is, of course, possible to carry out the molding by feeding a broad sheet or a continuous sheet.

Figures 3C, 3D:
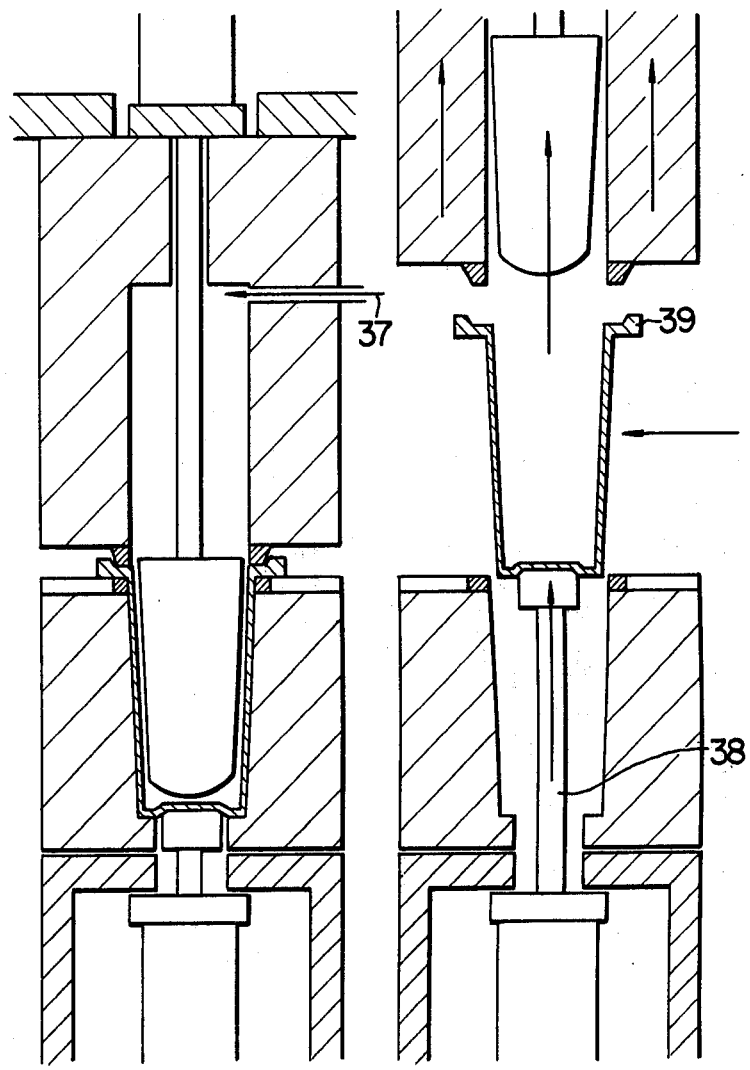

FIGS. 3a to 3d show the steps for molding a plastic container according to the process of this invention. As shown in FIG. 3a, the sheet 32 is fed to the female mold 31, and the auxiliary mold 33 is let descend, whereby the sheet 32 is forged and simultaneously cooled between the ring-shaped forging part 34 of the auxiliary mold and the ring-shaped forging part 35 of the female mold to form the flange part 36 of a container. Then, as shown in FIG. 3b, the plug is moved from a position on the sheet forward the inside of the cavity of the female mold to stretch the sheet preliminarily, after which compressed air is introduced from the compressed air-feeding path 37 of the auxiliary mold to form the sheet on the surface of the cavity of the female mold by the pressure difference as shown in FIG. 3c. Then, as shown in FIG. 3d, the auxiliary mold and the plug are let ascend, the formed container is ejected from the female mold by the ejecting means 38, and the container is removed to the lateral direction.

Though the step of punching the scrap part 39 out of the periphery of the flange is omitted in FIGS. 3a–3d, this scrap part 39 may be punched out simultaneously with the forging step or it may be punched out by another punching device after the forming.

The apparatus and process for producing a plastic container shown in FIGS. 1, 2 and 3a–3d are particularly suitable for producing a thin-wall container having a molding depth vs. aperture caliber ratio of 2.0 or more, a flange thickness of 1.4 mm or less and a side wall thickness of 0.10–0.6 mm from a thick plastic sheet having a thickness of 2 mm or more.

Said thermoplastic resin includes those conventionally employed in the thermoforming of a sheet, such as polyolefins (for example, polyethylene, polypropylene and the like), polyester resins, polyamide resins, polystyrene, vinyl chloride resins and the like, preferably crystalline plastics. In this invention, a monolayer sheet or multi-layer sheet composed mainly of these resins is used.

The process for producing said thick sheet of thermoplastic resin includes extrusion molding, injection molding and the like and is not particularly limited, though a T-die melt extrusion method by the use of an extruder is preferable. In order to make this invention more effective, it is preferable to produce the container from a sheet having a good moldability.

In order to produce a super-deep-drawn thin-wall polypropylene container having a strong stiffness and being excellent in all transparency, gloss and wall thickness distribution, the original sheet is produced preferably by the following process:

For example, a crystalline polypropylene resin is extruded into a sheet by a T-die by means of a melt extrusion method. Then, the sheet just after leaving the T-die, having a resin temperature of 210°–270° C., is passed through a means for slowly cooling a sheet, whereby it is slowly cooled at a cooling rate of 10° C./second or less to a temperature falling in the range of 140°–180° C. Then, it is contacted with one or plural cooling roll surfaces, whereby it is rapidly cooled at a cooling rate of 30° C./second or more to a sheet temperature of 40°–100° C. and solidified. Thus, an original sheet is made. If a broad and continuous original sheet is fed to a molding machine, preheated and formed, there can sometimes arise difficulties such as waviness of sheet in the preheating step due to the winding curl or unevenness of preheating. If a plurality of molds are arranged in a molding machine and many containers are simultaneously produced from such a broad sheet, the sheet part outside the part to be formed into container becomes a scrap and the amount of the scrap occurring at the time of molding sometimes amounts to 40–70% of the original sheet.

When a container is produced from a thick sheet, therefore, it is preferable to cut the sheet previously so as to have an area equal to or somewhat greater than the area of the aperture of container including the flange part, preheat such a cut sheet and feed it to the forming mold. A broad sheet may be punched out into a round form or a rectangular form in accordance with the shape and size of the forming mold. Preferably, however, the sheet extruded is slit either in the course of or after cooling the sheet to give a rectangular cut sheet which is then fed to the sheet-preheating means of the molding machine.

Even if the sheet is of rectangular cut size, it is easy to handle so long as it has a thickness of 2 mm or more, and it is possible to feed a preheated sheet on the forming mold.

If a container is formed from a cut sheet which has a size equal to the aperture area of the container including the flange part, the amount of scrap around the formed part can be reduced to 10% or less in the case of a rectangular container and 25% or less in the case of a round container. If a super-deep-drawn container is made from a thick cut sheet, there arises an important advantage that the amount of scrap formed can be reduced to a great extent as compared with the case of usual thermoforming of sheet.

Though the preheating means for the cut sheet is not particularly limited, a radiation heater, a contact heating plate heater, a hot air circulation furnace and the like are preferable. As the heating means for continuously heating a thick cut sheet and feeding it onto a forming mold, the contact heating plate of the belt conveyor type is preferable. A sheet can be heated uniformly by putting the sheet between two belt conveyors and passing the sheet between a pair of heating plates while mildly compressing the sheet between the heating plates.

Particularly when a deep-drawn container is produced by heating a sheet of crystalline resin such as polypropylene, polyethylene, polyester or the like to a temperature not exceeding its melting point, the uniform heating of sheet is of importance and a container having a great molding depth can be formed from a platelike sheet only by using a sheet preheated to a uniform temperature.

The pressing of sheet by the upside and downside hot press plates is carried out at such a pressure that the curl of sheet can be corrected and the whole of the upside and downside surfaces of sheet can uniformly be contacted with the surface of the hot press plates either directly or indirectly.

As the moldable temperature, a temperature falling in the range from the crystal melting point ($T_m$) to ($T_m - 50$)°C. is preferable in the case of crystalline polypropylene sheet.

The preheated sheet is sent to a forming mold shown in FIG. 2 which comprises a female mold composed of an open cavity and a circular forging part placed at the aperture end of said cavity (its inside shape and size are the same as those of the aperture end of the cavity of the female mold), an auxiliary mold which confronts the female mold and is equipped with a ring-shaped forging part making a pair with the forging part of the female mold, and a plug which is placed inside the auxiliary mold for drawing the sheet in the direction to the aperture of female mold.

In the molding apparatus shown in FIG. 2, the sheet transfer plate is used for the purpose of feeding a cut sheet to the forming mold and sending the molded article to the punching step. Preferably, the surface of the sheet transfer plate is coated with a thermally insulating material to prevent the preheated sheet from being cooled upon contact therewith. The structure of the sheet transfer means is not particularly limited.

The female mold is preferably a metallic mold made of iron, aluminum or the like provided with a cooling water-circulating paths in its interior for cooling the female mold by passing cooling water through the circulating paths. The flange part of the container is first formed by the upside and downside forging parts. The pressure applied to the forging surface should be 100 kg or more per $cm^2$ of the forging surface. If the pressure is less than 100 $kg/cm^2$, the flange part is not well molded. In order to form a relatively thin flange part well balanced with the wall thickness of the hollow part of container, it is preferable to carry out the forging by applying a forging pressure of about 150–300 $kg/cm^2$ in the case of polypropylene sheet. By this forging, it is easy to reduce the thickness of the flange part to an extent of about 70–20% based on the thickness of the original sheet.

The flange part which has been made thinner by forging acquires a high extent of crystal orientation, so that a transparent flange part can be formed even from an opaque thick sheet of polypropylene, polyethylene or the like. When a flange part is forged, it is preferable that the resulting flange part has a thickness of 70–30% based on the thickness of the original sheet. For example, if a round container having a molding depth vs. caliber ratio of 2.0 (caliber 60 mm, depth 120 mm) is formed from a polypropylene sheet having a thickness of 2 mm, the mean wall thickness of the hollow part decreases to about 0.22 mm. In contrast thereto, when a ring flange having a width of about 3 mm is formed at the aperture end of the hollow part, the thickness of the flange part is preferably in the range of 1.4–0.6 mm. If the thickness of the flange part is too great, the container loses the balance in design. If the flange part is too thin, the stiffness of the aperture part becomes weak.

The shape of the cross-section of the flange part can be widely varied by changing the shape of the forging means. When the flange part is formed by forging a preheated sheet, the forging means may be heated previously, if desired, in order to vary the shape of the cross-section of the flange part. In such a case, it is preferable to divide the female mold into a hollow mold and a forging mold in consideration of the cooling of the hollow part of the female mold.

In forging a flange part, it is advisable to fix the female mold firmly, let the auxiliary mold approach the female mold rapidly and forge the flange part instantaneously by the action of impact force. In this case, the auxiliary mold and the female mold must have a sufficient strength for resisting the force required for forging the flange part of the container.

The plug is preferably made of a metal and equipped with a heater in its interior. Preferably, the surface of the plug is mirror-finished by chromium plating or coated with a fluorocarbon resin.

The shape of the female mold is preferably round, rectangular or the like in accordance with the shape of the desired container, and the shape and dimensions of the female mold must coincide with those of the plug. Though the material for the female mold is not particularly limited, the mold is preferably made of a metal such as iron and constructed so as to have a cooling water-circulating paths in its interior. If necessary, the female mold is divided into a forging mold and a cavity mold, which are independently operated, and only the forging mold is heated.

Though the material for the auxiliary mold is not particularly limited, a metal such as iron is preferable. Though the compressed air-feeding path is provided on the top of the auxiliary mold in the molding apparatus of FIG. 2, the method of feeding the pressure fluid is not limited to it, and the pressure fluid may be directly blown onto the surface of sheet from the inside of the plug through the small holes provided in the front or rear surface of the plug.

Though the outer circumference of the flange may be punched out either simultaneously with molding or before molding, it is preferable to thin the part by forging and then punch it out when the sheet is so thick as to make the punching difficult. By this procedure, the punching becomes easy because it follows that a sheet having a thickness of 70–20% based on the thickness of the original sheet is punched out.

After the flange part has been forged, the plug is moved forward from the upside of the sheet towards the cavity of the female mold while fixing the flange with the upside and downside forging means until the plug reaches a depth of 80% or more of the cavity whereby the part of the original sheet coming inside the flange is preliminarily stretched till the area stretch ratio reaches 5 or more. It is preferred that within 2 seconds after forging the periphery of the sheet with the pair of forging molds the plug is moved forward from the upside of the sheet towards the interior of the cavity of the female mold to draw the sheet into the female mold. When the time from forging the flange part of the container to inserting the plug into the female mold exceeds 2 seconds, there is seen a tendency that the wall of the resulting container becomes thicker on the boundary between the flange part and the cavity than in the other part and hence the finish on the boundary part becomes bad. Furthermore, under said conditions, the side wall of the resulting container tends to become thin and inferior in stiffness. After forging and cooling the flange part of the container, the other part of the sheet is gradually cooled when the sheet is allowed to stand in the state that the flange part is fixed. Therefore, it is preferable to insert the plug as soon as possible before the inside part of the sheet is cooled. Since in the process of this invention the flange part of the container is beforehand formed and then the sheet is preliminarily stretched by inserting a plug from the upside of sheet while firmly fixing the flange part with the forging molds, there is no danger that the sheet of the flange part is pulled into the hollow part in the course of inserting the plug. Therefore, the boundary line between the flange part and the hollow part is clear and the hollow part has a uniform thickness even near the aperture end or near the bottom. Further, since the plug is moved forward to a depth of 80% or more of the cavity while firmly fixing the flange part with a great force and the sheet part coming inside the flange is preliminarily stretched till the area stretch ratio reaches 5 or more, the sheet part inside the flange is stretched sufficiently uniformly by the preliminary stretching except for the sheet part contacting with the tip of the plug. In the subsequent compressed air-feeding step, the part of sheet contacting with the tip of the plug is mainly stretched largely.

If the moldable temperature of the sheet is expressed by $T_s$, the temperature of plug is preferably kept in the temperature range from $(T_s+10)°C$. to $(T_s-40)°C$. When a crystalline polypropylene sheet is formed, if the crystal melting point thereof is expressed by $T_m$, it is preferable that the sheet is preheated to a temperature falling in the range from $T_m$ to $(T_m-50)°C$. and the flange part is forged at said temperature, after which a metallic plug preheated to a temperature ranging from $(T_m-5)°C$. to $(T_m-50)°C$. is inserted into the female mold from the upside of the sheet to preliminarily stretch the sheet into the female mold.

FIG. 4 shows the state of plug which has drawn the sheet to the final plug insertion position in the female mold, i.e. an enlarged view of the state of FIG. 3b. The plug 41 is composed of the front part 41-1 and the rear part 41-2. In all the cross-sections of the plug passing the central axis 42 along the movement direction of said plug and parallel to said central axis 42, it is preferable that the front part 41-1 is substantially semi-elliptical, the central axis 42 is on the short axis of the ellipse, the boundary line 43 between the front part 41-1 and the rear part 41-2 nearly corresponds to the long axis of the ellipse and, when the length of the long axis is expressed by a and the length of the short axis is expressed by b, the shape of the contour line 44 of the front part of plug is in the range of $5 \geq a/b \geq 1$. It is also preferable that the contour line 44 of the front part of plug and the contour line 45 of the rear part of plug are smoothly connected with each other, the contour line 45 starting from the boundary 43 between the front part of plug and the rear part of plug and extending toward the rear end of plug involves a substantially linear part, the ratio between the length from the level of the aperture end of the female mold to the tip of the plug on the central axis and the depth from the aperture end of the female mold to the bottom of the female mold is in the range of 0.85-0.98 at the final plug insertion position in the female mold, and the ratio between the outer diameter of the plug and the inner diameter of the female mold at the height of the boundary 43 between the front and the rear parts of plug is in the range of 0.7-0.95.

At the same height 47 as the aperture end of the female mold 46, the shape of contour line of the cross-section perpendicular to the central axis 42 of the plug 41 coincides with that of the aperture end of the female mold 46, its size is smaller than the size of the latter over the whole circumference to an extent substantially corresponding to the thickness of the sheet 45, and the plug gradually becomes thinner from the rear end 49 towards the front part 41-1, owing to which the preheated sheet 45 drawn into the cavity of the female mold can contact with the surface of the plug 41 over the whole surface of the plug side at the final insertion position of the plug 41 in the female mold 48 as shown in FIG. 4.

A plug of a known shape is shown in FIG. 5 for comparison, where at the final insertion position of the plug 51 in the female mold 52 the size of contour line of the section perpendicular to the central axis 54 of the plug 51 at the same height 55 as the aperture end 53 of the female mold is considerably smaller than the size of the contour line of the aperture end 53 of the female mold over the whole circumference in excess to the extent corresponding to the thickness of the sheet 56, so that the preheated sheet 56 drawn into the cavity of the female mold 52 comes into contact with the front part 51-1 but it separates from the rear part of plug 51-2 gradually.

If a container is produced by means of a pressure-forming apparatus using a plug having the known form of FIG. 5, in the step of drawing the sheet by the insertion of the plug the part of sheet contacting with the front part of the plug is stretched while adhering to the surface of the plug, whereas in the sheet part not contacting with the plug the sheet is locally stretched greatly and becomes thin. As a result, there arises a great difference in thickness between the sheet part contacting with the front part of plug and the sheet part not contacting with the plug, so that a clear line due to the discontinuous change of wall thickness appears at the boundary of the contact part and the non-contact part of the formed container.

When a container is produced with the pressure-forming apparatus of FIG. 2 in which a plug having the form of this invention shown in FIG. 4 is used, the sheet first contacts with the tip of the plug in the step of drawing the sheet by the insertion of the plug into the cavity of the female mold. As the plug descends, the sheet gradually comes into contact not only with the front part but also the rear part of the plug and, at the final plug insertion position, the whole surface of the plug comes into contact with the sheet as shown in FIG. 4.

When a container is produced according to the process of this invention, the sheet is stretched by the plug as the plug moves forward in the female mold. As a result of the stretching, the area of the sheet contacting with the plug increases and the boundary line between the sheet part contacting with the plug and the sheet part not yet contacting with the plug shifts toward the rear part of the plug until at the final plug insertion position the boundary line has been shifted to the neighborhood of the rear end of the plug. The sheet is stretched with the movement of the plug, and the central part of the sheet is first contacted with the tip of the plug which becomes difficult to stretch due to the adhesion or friction between the plug surface and the sheet. As the plug descends, the boundary line between the sheet part not yet adhering to the plug and easy to stretch and the part adhering to the plug and difficult to stretch successively shifts from the central part of the sheet to the peripheral part of the sheet, so that the sheet drawn into the aperture of the female mold continuously decreases in thickness from the sheet part contacting with the front part of plug to the sheet part contacting with the rear part of plug.

In the deep-drawn container produced by the use of the plug of FIG. 5, a difference in wall thickness distribution is apt to arise between the upper part of the sidewall of the container and the lower part of the sidewall, so that a line is easily formed on the sidewall. In contrast thereto, in the deep-drawn container produced by using the plug of FIG. 5, the wall thickness mildly changes from the lower part of the sidewall to the upper part of the sidewall of the container and there is no part of extreme thinness, so that the container has a strong stiffness and no lines on its sidewall.

After the sheet has preliminarily been stretched by the plug, a pressure fluid is introduced from the plug side onto the sheet, whereby the sheet part inside the flange is stretched by the pressure difference till the area stretch ratio reaches 9.0 or more based on the original sheet to press the sheet onto the surface of the cavity of the female mold to impart the shape of the mold to the sheet.

In the case of solid phase pressure forming of a polypropylene sheet, the pressure of compressed air is preferably 4 kg/cm² or more. For forming a crystalline polypropylene container having a molding depth vs. caliber ratio of 2.0 or more, the pressure of compressed air is preferably in the range of 5–10 kg/cm².

The container may be of a round shape or a rectangular shape, and a container having a rib can also be formed in the same manner. A straight container in which the inner diameter of the aperture end of the hollow part is equal to the inner diameter of the bottom, as well as a tapered container in which the diameter gradually decreases from the aperture to the bottom, can also be formed. The process of this invention is effective for forming containers having a molding depth vs. caliber ratio of 2.0 or more and particularly super-deep-drawn containers having said ratio of 3.0–4.0.

The thin-wall container produced according to the process of this invention which is composed of a concave hollow part and a ring-shaped flange part positioned at the aperture end of the hollow part, has a mean wall thickness ranging from 0.1 to 0.6 mm at the sidewall and bottom of the hollow part and has a molding depth vs. caliber ratio of 2.0 or more, is lighter in weight than known plastic containers produced by known processes and is quite excellent in performances such as gloss, transparency, strength, stiffness, gas barrier property and the like owing to the high extent of stretch and orientation.

According to the process of this invention, the so-called tapered containers, capable of being stacked, in which the inner diameter gradually increases from the bottom of the hollow part to the aperture end and the outer diameter of the bottom is smaller than the inner diameter of said aperture end, can be produced easily, which much facilitates the transport of the containers.

Thin-wall containers produced according to the known thermoforming method are small in molding depth vs. aperture caliber ratio and in area stretch ratio, so that they are insufficient in performances.

In order to produce a container having a molding depth vs. aperture caliber ratio of 2 or more by the known injection molding process, it is necessary to make the mean wall thickness at least 1–2 mm which requires a large quantity of the starting material. Furthermore, the container lacks stretch and orientation so that they are inferior in performances.

Wide-mounted bottle-like containers produced by the known blow-molding process are uneven in wall thickness distribution, insufficient in stretch and orientation and weak in stiffness for their weight, so that they are inferior in performances.

The thin-wall deep-drawn container having a molding depth vs. aperture caliber ratio of 2.0 or more, produced according to the process of this invention, not only exhibits a remarkable decorative character when filled with foodstuff or the like but also is excellent in longterm storability of the contents when its mouth is closely sealed and is light in weight for its inner volume, so that it is advantageous in the phase of circulation cost. Further, the container per se has no line of juncture at all, unlike blow-molded articles, so that it is also excellent in strength to inner pressure.

The container of this invention is suitable for filling any contents selected from liquid, solid and powder and particularly preferable as a container for foodstuffs.

This invention will be illustrated below more concretely with reference to Examples, which are presented not by way of limitation but by way of illustration.

EXAMPLE 1

A deep-drawn round container was produced from a polypropylene sheet according to the process of this invention by using the same container producing apparatus as shown in FIG. 1.

The sheet used in the forming was prepared by melt-extruding through a T-die crystalline polypropylene having a melting point of 165° C. and a melt index of 1.0. The sheet at a resin temperature of 230° C. just after leaving the T-die was gradually cooled to 169° C. by cooling drums, and then passed through three cooled rolls to rapidly cool the sheet to 65° C., thereby obtaining an original sheet having a thickness of 2.0 or 2.5 mm, width of 600 mm and a length of 600 mm. This sheet was cut into 74 mm square size and placed in a sheet-preheating means. It was then passed between hot press plates by means of upside and downside conveyor belts to preheat the whole surface of the sheet to about 155° C. A container was formed from this sheet by the same steps as shown in FIGS. 3a–3d.

A deep-drawn container having the shape shown in FIG. 6 having a caliber of 60 mm, a depth of 120 mm and a depth vs. caliber ratio of 2.0 was formed from an original sheet having a thickness of 2.0 mm. The proportion of the scrap 61 to the cut sheet was somewhat smaller than 30%. The wall thickness of the container was measured at points A–J shown in FIG. 6. At the respective heights designated by symbols A–J, the thickness were measured at 4 points at intervals of 90° along the circumference, from which the mean thickness at points A–J were determined.

A deep-drawn container having the shape shown in FIG. 7 having a caliber of 60 mm, a depth of 180 mm and a depth vs. caliber ratio of 3.0 was formed from the original sheet having a thickness of 2.5 mm. The wall thickness of the container was measured at points A–J of FIG. 7. The means wall thickness at respective points were determined in the same manner as in the container of FIG. 6.

In Table 1 are listed the mean wall thicknesses at points A–J of the above-mentioned two kinds of deep-drawn containers. Each of the containers was good in wall thickness distribution and excellent in transparency and toughness.

TABLE 1

| Depth vs. caliber ratio | | 2.0 | 3.0 |
|---|---|---|---|
| Thickness of original sheet (mm) | | 2.0 | 2.5 |
| Wall thickness of container (mm) | A | 1.1 | 1.4 |
| | B | 0.32 | 0.28 |
| | C | 0.23 | 0.24 |
| | D | 0.22 | 0.23 |
| | E | 0.20 | 0.19 |
| | F | 0.20 | 0.18 |
| | G | 0.21 | 0.17 |
| | H | 0.26 | 0.19 |
| | I | 0.34 | 0.26 |
| | J | 0.40 | 0.30 |

EXAMPLE 2

A deep-drawn round container having an aperture caliber of 60 mm and a molding depth of 120 mm was produced according to the process of this invention by using the molding apparatus shown in FIG. 2.

In FIG. 2, the auxiliary mold, the female mold and the plug were all made of iron and the inner surface of the female mold and the surface of the plug were finished by chromium plating. The temperature of the plug was regulated with the internal heater. Cooling water was circulated inside the female mold. The cross-sections of the female mold and the plug had the shapes shown in FIGS. 4 and 5. Hereinafter, a plug whose cross-section has the shape of FIG. 4 is referred to as the plug 1, and a plug whose cross-section has the shape of FIG. 5 is referred to as the plug 2.

The steps for producing the container were as shown in FIGS. 3a–3d. After forming the container, the part surrounding the flange was punched away and then the wall thickness distribution in the container produced according to the process of this invention was measured. The plastic sheets used for forming the container were polypropylene, polyethylene and multilayer sheet of polypropylene type.

The polypropylene sheet was prepared by melt extrusion through a T-die of a crystalline polypropylene (melting point 160° C.) obtained by adding 25 parts by weight of a propylene random copolymer (MI=7.0) to 100 parts by weight of propylene homopolymer (MI=1.0). The sheet just after leaving the T-die, at a resin temperature of 240° C., was slowly cooled to 170° C. by passing the same through a sheet cooling means, after which it was passed through a gap between two cooling rolls, thereby rapidly cooling the sheet to a sheet temperature of 60° C. to obtain a sheet having a thickness of 2.2 mm and a width of 160 mm. A square sheet of 75 mm square was cut out therefrom and used for forming.

The polyethylene sheet was prepared by melt extrusion, through a T-die, of a high density polyethylene (melting point 128° C.) having a density of 0.96 g/cc. The sheet had a thickness of 2.5 mm and a width of 160 mm. Similarly to the above, a square sheet of 75 mm square was cut out therefrom and used for forming.

The polypropylene type multi-layer sheet was a 5-layer sheet [polypropylene (the same as above)/adhesive polypropylene/saponified ethylene-vinyl acetate copolymer resin/adhesive polypropylene/polypropylene (the same as above)] having a thickness of 2.3 mm and a width of 160 mm prepared by a co-extrusion method under the same sheet drawing and cooling conditions as mentioned above as to the polypropylene sheet. From this sheet a square sheet of 75 mm square was cut out and used for forming.

The wall thickness of the container was measured at points A–J shown in FIG. 6. At the respective heights designated by symbols A–J, the thickness were measured at 4 points at intervals of 90° along the circumference, from which the mean thickness at points A–J were determined.

In Table 2 are listed the mean wall thicknesses at points A–J, the presence or absence of line on the sidewall and the results of the evaluation of stiffness of the deep-drawn containers produced according to the process of this invention by using plug 1 and plug 2. The presence or absence of line on the sidewall was evaluated with the naked eye, while the degree of stiffness was evaluated by touch feeling.

TABLE 2

| | | Sheet | | | | | |
|---|---|---|---|---|---|---|---|
| | | Polypropylene | | Polyethylene | | Polypropylene type multi-layer sheet | |
| | | Plug | | | | | |
| Item of evaluation | | Plug 1 | Plug 2 | Plug 1 | Plug 2 | Plug 1 | Plug 2 |
| Thickness of container (mm) | A | 0.82 | 0.84 | 0.85 | 0.88 | 0.92 | 0.90 |
| | B | 0.28 | 0.32 | 0.29 | 0.34 | 0.27 | 0.37 |
| | C | 0.23 | 0.22 | 0.25 | 0.24 | 0.24 | 0.23 |
| | D | 0.22 | 0.19 | 0.24 | 0.18 | 0.24 | 0.20 |
| | E | 0.23 | 0.17 | 0.24 | 0.19 | 0.23 | 0.18 |
| | F | 0.21 | 0.17 | 0.23 | 0.17 | 0.22 | 0.18 |
| | G | 0.22 | 0.45 | 0.22 | 0.48 | 0.23 | 0.44 |
| | H | 0.24 | 0.30 | 0.26 | 0.32 | 0.25 | 0.29 |
| | I | 0.25 | 0.28 | 0.27 | 0.30 | 0.26 | 0.28 |
| | J | 0.31 | 0.32 | 0.32 | 0.33 | 0.29 | 0.30 |
| Appearance of sidewall*[1] | | A | C | B | C | A | C |
| Stiffness*[2] | | B | C | A | C | B | C |

Note:
*[1] 4-rank evaluation
A: No streaks were formed at the time of forming the container.
B: Substantially no streaks were formed at the time of forming the container.
C: A few streaks were formed at the time of forming the container.
D: Many streaks were formed at the time of forming the container.
*[2] 4-rank evaluation
A: Strong
B: Fairly strong
C: Rather weak
D: Weak The deep-drawn containers produced according to the process of this invention are excellent in all of the wall thickness distribution, appearance and stiffness.

What is claimed is:

1. A process for producing a thin-wall, deep-drawn container from a thermoplastic resin sheet by plug assist pressure-forming in a cavity of a female mold, comprising precutting a mono-layer or multi-layer sheet having a thickness of 1.2 mm or more composed mainly of a crystalline polypropylene, extruded through a T-die by a melt-extrusion method to a tetragonal shape, having an area slightly larger than the area of the periphery of a ring-shaped flange part of the container to be formed, feeding the thus precut tetragonal sheet between a pair of conveyor belts, and passing the resulting assembly between hot press plates by rotating the conveyor belts therebetween, thereby passing the assembly between the hot press plates while pressing the assembly so that the entire surfaces of both upside and downside of the sheet are uniformly contacted with the surfaces of the hot press plates through the conveyor belts to preheat uniformly the sheet to a moldable temperature within the range from the crystal melting point of the crystalline polypropylene (Tm) to (Tm-50)°C., moving the preheated sheet to a position over an aperture end of the cavity of the female mold, subsequently applying a pressing pressure of 100 kg/cm$^2$ or more to the preheated sheet from the upside and the downside by means of a pair of ring-shaped forging means, the inner shape and size of the forging means being the same as those of the aperture end of the cavity of the female mold, whereby the somewhat inside of the peripheral part of the sheet is forged and cooled to form the ring-shaped flange part inside the peripheral part of the tetragonal precut sheet, drawing the sheet, while firmly fixing said flange part of the sheet with said pair of forging means, into the cavity of the female mold to a depth of at least 80% of the depth of the cavity by means of a tapered metal plug maintained at a temperature of $(Ts+10)°C.$ to $(Ts-40)°C.$, wherein Ts is the temperature of the preheated sheet, which plug is composed of a front part and a rear part, and in which plug in all the plug cross-sections including a central axis along the movement direction of the plug and parallel to the central axis of the plug, the front part is substantially semi-elliptical; the central axis of the plug is on the short axis of the ellipse; the boundary line between the front part and the rear part nearly corresponds to the long axis of the ellipse; when the length of the long axis is expressed by a and the length of the short axis is expressed by b, the shape of the contour line of the front part of plug is in the range of $5 \geq a/b \geq 1$; the contour line of the front part and the contour line of the rear part are smoothly connected with each other; the contour line starting from the boundary line between the front part and the rear part and approaching the rear end involves a substantially linear part; the shape of contour of the cross-section perpendicular to the central axis of the plug coincides with the shape of contour of the aperture end of the female mold; and the size of the above cross-section contour of the plug is smaller than the aperture end of the female mold over the whole circumference by a degree substantially corresponding to the thickness of said sheet, at the same height as the aperture end of the female mold, so that at the final plug insertion position in the female mold the preheated sheet drawn into the cavity of the female mold can contact with the entire surface of the plug, and which plug decreases in diameter gradually from the rear part end to the front part, and in which plug the ratio between the length from the height of aperture end of the female mold to the front part of the plug on the central axis of the plug and the depth from the aperture end of the female mold to the bottom of the female mold is in the range of 0.85 to 0.98 at the final plug insertion position in the female mold, and the ratio between the outer diameter of the plug and the inner diameter of the female mold is 0.7 to 0.95 at the height of the boundary line between the front part of plug and the rear part of plug; thereby preliminarily stretching the part of the original sheet inside the flange part, and then introducing a pressure fluid from the plug side onto the sheet, to stretch the part of the sheet inside the flange part by the pressure difference until the area stretch ratio reaches 9 or more based on the original sheet, whereby the sheet is formed on the surface of the cavity of the female mold so as to give a molding dapth vs. caliber ratio of at least 2.0.

2. A process according to claim 1, wherein the preheated sheet is drawn into the cavity of the female mold by means of the plug within 2 seconds after the forging the peripheral part of the sheet by the pair of forging means.

* * * * *